(12) United States Patent
Poon

(10) Patent No.: US 7,728,909 B2
(45) Date of Patent: *Jun. 1, 2010

(54) METHOD AND SYSTEM FOR ESTIMATING MOTION AND COMPENSATING FOR PERCEIVED MOTION BLUR IN DIGITAL VIDEO

(75) Inventor: Eunice Poon, Scarborough (CA)

(73) Assignee: Seiko Epson Corporation, Tokyo (JP)

( * ) Notice: Subject to any disclaimer, the term of this patent is extended or adjusted under 35 U.S.C. 154(b) by 1112 days.

This patent is subject to a terminal disclaimer.

(21) Appl. No.: 11/377,030

(22) Filed: Mar. 16, 2006

(65) Prior Publication Data

US 2006/0280249 A1    Dec. 14, 2006

Related U.S. Application Data

(60) Provisional application No. 60/689,808, filed on Jun. 13, 2005.

(51) Int. Cl.
*H04N 5/50* (2006.01)
*H04N 11/02* (2006.01)

(52) U.S. Cl. .................... 348/451; 375/240.16

(58) Field of Classification Search ......... 348/451–452, 348/443, 449, 441, 445, 448; 375/240.1, 375/240.16, 240.27

See application file for complete search history.

(56) References Cited

U.S. PATENT DOCUMENTS

| | | | | |
|---|---|---|---|---|
| 4,862,267 | A * | 8/1989 | Gillard et al. | ............... 348/443 |
| 5,051,844 | A * | 9/1991 | Sullivan | .................. 358/3.03 |
| 6,347,153 | B1 * | 2/2002 | Triplett et al. | ............... 382/224 |
| 7,365,801 | B2 | 4/2008 | Kondo | |
| 2002/0154088 | A1 | 10/2002 | Nishimura | |
| 2003/0006991 | A1 | 1/2003 | De Haan et al. | |
| 2003/0091112 | A1 | 5/2003 | Chen | |
| 2003/0122772 | A1 | 7/2003 | Park et al. | |
| 2004/0046891 | A1 | 3/2004 | Mishima et al. | |
| 2004/0086047 | A1 | 5/2004 | Kondo et al. | |
| 2004/0233157 | A1 | 11/2004 | Sekiya et al. | |
| 2005/0030302 | A1 | 2/2005 | Nishi et al. | |

(Continued)

FOREIGN PATENT DOCUMENTS

JP      2000-175191      6/2000

(Continued)

*Primary Examiner*—Paulos M Natnael

(57) ABSTRACT

A method for compensating for perceived blur due to motion between a current frame and a previous frame of a digital video sequence comprises estimating a motion vector between the frames for each of a plurality of pixel blocks in the current and previous frames. A cluster motion vector is then estimated for each of a plurality of clusters of the motion vectors based on one of vectors in each cluster and motion vectors in proximate clusters. The cluster motion vector of its corresponding cluster is allocated to each pixel in the current frame. An initial guess frame is generated based on the current frame and pixels in the guess frame are blurred as a function of their respective allocated cluster motion vectors. Each blurred pixel is compared with a respective pixel in the current frame to generate an error pixel for each respective pixel. Each error pixel is blurred and weighted and then each error pixel and its respective pixel is combined in the initial guess frame thereby to update the guess frame and compensate for blur. A system and computer program for perceived blur compensation is also provided.

18 Claims, 12 Drawing Sheets

U.S. PATENT DOCUMENTS

| | | |
|---|---|---|
| 2005/0053135 A1 | 3/2005 | Haskell et al. |
| 2005/0053291 A1 | 3/2005 | Mishima et al. |
| 2005/0100095 A1* | 5/2005 | Itoh et al. ............... 375/240.16 |
| 2005/0140626 A1 | 6/2005 | Doyen et al. |
| 2005/0157792 A1 | 7/2005 | Baba et al. |
| 2005/0243921 A1* | 11/2005 | Au et al. ................ 375/240.12 |
| 2006/0062304 A1* | 3/2006 | Hsia ...................... 375/240.16 |

FOREIGN PATENT DOCUMENTS

| | | |
|---|---|---|
| JP | 2001-298745 | 10/2001 |
| JP | 2004-328635 | 11/2004 |
| JP | 2005-049784 | 2/2005 |

* cited by examiner

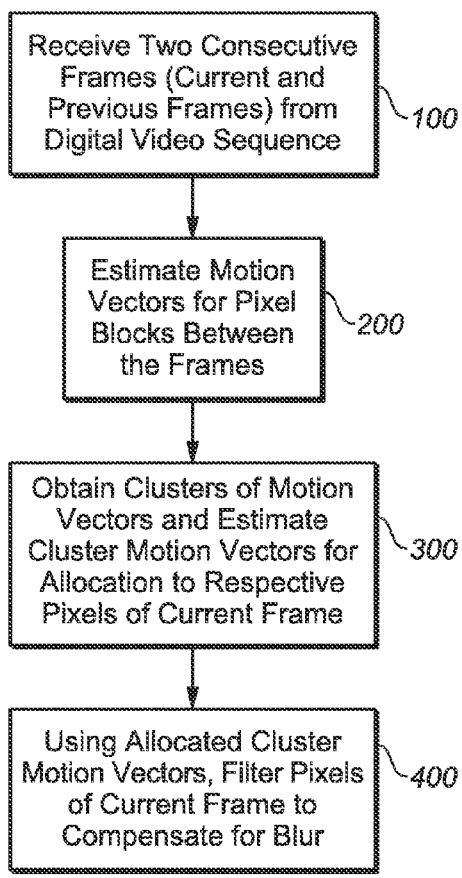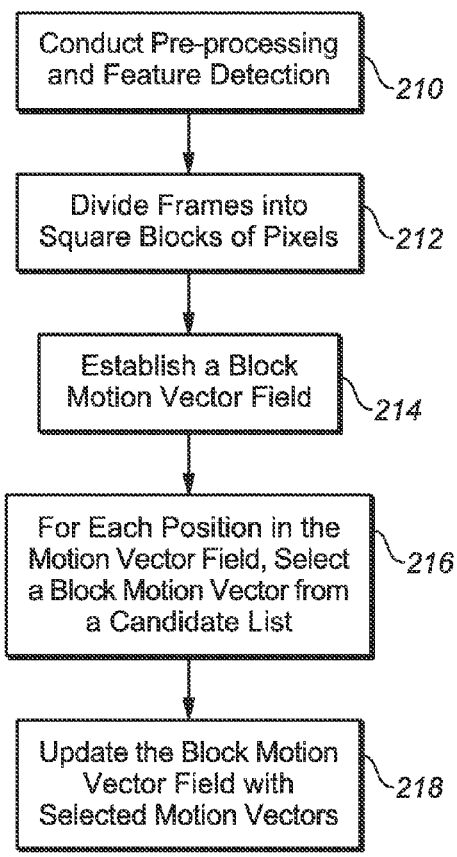
FIG. 7
FIG. 8

Initial Guess   Iteration 1   Iteration 2   Iteration 4

METHOD AND SYSTEM FOR ESTIMATING MOTION AND COMPENSATING FOR PERCEIVED MOTION BLUR IN DIGITAL VIDEO

CROSS-REFERENCE TO RELATED APPLICATION

This application claims the benefit under 35 U.S.C. 119(e) of U.S. Provisional Patent Application Ser. No. 60/689,808, filed on Jun. 13, 2005, the content of which is incorporated herein by reference.

FIELD OF THE INVENTION

The following relates generally to image processing and more particularly to a method and system for estimating motion in digital video and to a method and system for compensating for perceived motion blur in digital video displayed by hold-type displays.

BACKGROUND OF THE INVENTION

It is well known that moving objects in digital video displayed on a hold-type display device such as a liquid crystal display (LCD) can appear blurry to an observer. The perceived blur is known to be caused in part by the relatively slow LC response of the liquid crystal cells. When compared with an impulse-type device such as a cathode ray tube (CRT) device, for example, an LCD device has a much slower brightness transition response time. The perceived blur is also caused in part by prolonged light emission inherent in the sample-and-hold driving technique commonly employed by LCD devices, which results in formation of after-images on the human retina. These after-images produce a blurred visual perception as the video sequence is being observed.

It has been proposed to compensate for the relatively slow response time of an LCD device by modifying the LCD device such that it adjusts the driving voltage applied to each device pixel by an amount proportional to a gray level transition. This is commonly known as the "overdrive" technique, and is described by H. Okurama, M. Akiyama, K. Takotoh, and Y. Uematsu in the publication entitled "A New Low Image-Lag Drive Method For Large-Size LCTVs," (SID '02 Digest, pp. 1284-1287, 2002).

It has also been proposed to compensate for the prolonged light emission inherent in the sample-and-hold driving technique by modifying the LCD device using black frame insertion, as described by T. Kurita in the publication entitled "Consideration on Perceived MTF of Hold Type Display For Moving Images," (IDW '98 Digest, pp. 823-826, 1998). U.S. Patent Application Publication No. 2003/0122772 to Park et al. also relates to black frame insertion and discloses a method for operating an LCD device by adjusting signals to the LCD device in order to control the ratio of real data to inserted black data. The ratio is controlled in accordance with the speed of the motion in the video stream. In particular, an increased ratio of black data to video data is said to prevent the appearance of motion blur.

Another technique used to compensate for prolonged light emission involves backlight blinking, as described by T. Furuhashi, K. Kawabe, J. Hirikata, Y Tanaka and T. Sato in the publication entitled "High Quality TFT-LCD System For Moving Picture" (SID '02 Digest, pp. 1284-1287, 2002).

In order to avoid modifying the hold-type display itself, it is known to apply video pre-processing to frames of the digital video sequence prior to display on the hold-type device in order to compensate for motion blur. For example, as described by K. Sekiya and H. Nakamura, in the publication entitled "Eye-Trace Integration Effect on the Perception of Moving Pictures and a New Possibility For Reducing Blur" (SID '02 Digest, pp. 930-933, 2002) the low-pass filtering effect of LCDs on a step function is analyzed and used to introduce waveform modulation in order to reduce motion blur in rectangular waveforms.

Another video pre-processing technique for motion blur compensation is detailed by M. Klompenhouwer and L. J. Velthoven, in the publication entitled "Motion Blur Reduction for Liquid Crystal Displays: Motion Compensated Inverse Filtering" (Visual Communications and Image Processing, pp. 690-698, 2004). According to this technique, blur is reduced by processing each pixel with a one-dimensional high-pass filter oriented in the local direction of motion. As with other known inverse filtering methods, however, noise can be problematic.

U.S. Patent Application Publication No. 2003/0006991 to De Haan et al. discloses a method for suppressing motion blur due to motion integration along a trajectory that employs inverse integration filtering of the video signal. High spatial frequency properties of the video signal are determined such that filtering in flat regions of the image can be avoided. The method is purported to reduce the noise modulation that is typical of other inverse filtering methods.

Other pre-processing techniques have also been considered. For example, U.S. Patent Application Publication No. 2002/0154088 to Nishimura discloses a method for displaying an image on an LCD display which, based on a determined motion vector, switches between an image signal making up the input image and a blanking signal. The method is purported to reduce the flickering, trailing and image-retention phenomenon caused by prior attempts to compensate for the physical characteristics of an LCD display compared to a CRT device. The method factors the speed of image motion to alter the rate at which the non-image signal is displayed. In particular, when motion of an image is fast, the rate at which the non-image signal is displayed during one frame is increased and control is exerted such that the level of the non-image signal comes nearer to the level of white color rather than the level of black color. The converse is true when the motion of an image is slow. As such, display luminance and contrast is generally increased.

It is an object to provide a novel method and system for estimating motion and compensating for perceived motion blur in digital video.

SUMMARY OF THE INVENTION

According to one aspect there is provided a method of estimating motion of pixels between a current frame and a previous frame in a digital video sequence, comprising:

estimating a motion vector between the frames for each of a plurality of pixel blocks of said current and previous frames;

estimating a cluster motion vector for each of a plurality of clusters of motion vectors based on one of motion vectors in each cluster and or motion vectors in proximate clusters;

allocating to each pixel in the current frame, the cluster motion vector of its corresponding cluster.

The estimating a motion vector may comprise dividing the current and previous frames into a plurality of the pixel blocks and wherein said motion vector estimating comprises: for each of the pixel blocks, selecting from a list of motion vector candidates a motion vector that provides the least difference between the pixel block in the current frame and a corresponding pixel block in the previous frame.

The estimating a cluster motion vector providing may comprise assigning cluster motion vectors to respective ones of the clusters that have a first threshold proportion of motion vectors with substantially the same direction and at least a threshold average extent; and in the event that less than a second threshold proportion of assigned cluster motion vectors have substantially the same direction, iteratively assigning the motion vectors of assigned clusters to proximate ones of unassigned clusters.

In accordance with another aspect, there is provided a method of compensating for perceived blur due to motion between a current frame and a previous frame of a digital video sequence using estimates of motion direction and motion extent of pixels between the frames, the method comprising:

generating an initial guess frame based on the current frame;

blurring pixels in the guess frame as a function of their respective estimated blur directions and blur extents;

comparing each blurred pixel with a respective pixel in the current frame to generate an error pixel for each respective pixel;

blurring and weighting each error pixel; and combining each error pixel and its respective pixel in the initial guess frame thereby to update the guess frame and compensate for blur.

The weighting may be a function of the respective pixel motion (extent and direction).

In accordance with another aspect, there is provided a method of compensating for perceived blur due to motion between a current frame and a previous frame of a digital video sequence comprising:

estimating a motion vector between the frames for each of a plurality of pixel blocks in the frames;

estimating a cluster motion vector for each of a plurality of clusters of motion vectors based on one of motion vectors in each cluster and motion vectors in proximate clusters;

allocating to each pixel in the current frame, the cluster motion vector of its corresponding cluster;

generating an initial guess frame based on the current frame; blurring pixels in the guess frame as a function of their respective allocated cluster motion vector;

comparing each blurred pixel with a respective pixel in the current frame to generate an error pixel for each respective pixel;

blurring and weighting each error pixel; and combining each error pixel and its respective pixel in the initial guess frame thereby to update the guess frame and compensate for blur.

In accordance with another aspect, there is provided a system for estimating motion of pixels between a current frame and a previous frame in a digital video sequence, comprising:

a block vector calculator determining a motion vector between the frames for each of a plurality of pixel blocks of the current and previous frames;

a cluster vector calculator determining a cluster motion vector for each of a plurality of clusters of motion vectors based on one of motion vectors in each cluster and motion vectors of proximate clusters; and a pixel vector allocator allocating to each pixel in the current frame, the cluster motion vector of its corresponding cluster.

In accordance with another aspect, there is provided a system for compensating for perceived blur due to motion between a current frame and a previous frame of a digital video sequence using estimates of motion direction and motion extent of pixels between the frames, the system comprising:

a motion blur filter array blurring pixels in an initial guess image, that is based on the current frame, as a function of their respective estimated blur directions and blur extents;

a comparator comparing each blurred pixel with a respective pixel in the current frame to generate an error pixel for each respective pixel, said motion blur filter array further blurring and weighting each error pixel; and an adder combining each error pixel and its respective pixel in the initial guess frame thereby to update the guess frame and compensate for blur.

In accordance with another aspect, there is provided a system for compensating for perceived blur due to motion between a current frame and a previous frame of a digital video sequence comprising:

a block vector calculator estimating a motion vector between the frames for each of a plurality of pixel blocks in the frames;

a cluster vector calculator estimating a cluster motion vector for each of a plurality of clusters of motion vectors based on one of motion vectors in each cluster and motion vectors in proximate clusters;

a pixel vector allocator allocating to each pixel in the current frame, the cluster motion vector of its corresponding cluster;

a motion blur filter array blurring pixels in an initial guess image based on the current frame as a function of their respective estimated blur direction and blur extent;

a comparator comparing each blurred pixel with a respective pixel in the current frame to generate an error pixel for each respective pixel, said motion blur filter array further blurring and weighting each error pixel; and an adder combining each error pixel and its respective pixel in the initial guess frame thereby to update the guess frame and compensate for blur.

In accordance with another aspect, there is provided a computer readable medium including a computer program for estimating motion of pixels between a current frame and a previous frame in a digital video sequence, the computer program comprising:

computer program code for estimating a motion vector between the frames for each of a plurality of pixel blocks of said current and previous frames;

computer program code for estimating a cluster motion vector for each of a plurality of clusters of motion vectors based on one of motion vectors in each cluster and motion vectors in proximate clusters; and computer program code for allocating to each pixel in the frame, the cluster motion vector of its corresponding cluster.

In accordance with another aspect, there is provided a computer readable medium including a computer program compensating for perceived blur due to motion between a current frame and a previous frame of a digital video sequence using estimates of motion direction and motion extent of pixels between the frames, the computer program comprising:

computer program code for generating an initial guess frame based on the current frame;

computer program code for blurring pixels in the guess frame as a function of their respective estimated blur directions and blur extents;

computer program code for comparing each blurred pixel with a respective pixel in the current frame to generate an error pixel for each respective pixel;

computer program code for blurring and weighting each error pixel; and computer program code for combining each error pixel and its respective pixel in the initial guess frame thereby to update the guess frame and compensate for blur.

In accordance with another aspect, there is provided a computer readable medium including a computer program for compensating for perceived blur due to motion between a current frame and a previous frame of a digital video sequence comprising, the computer program comprising:

computer program code for estimating a motion vector between the frames for each of a plurality of pixel blocks in the motion blurred frame;

computer program code for a cluster motion vector for each of a plurality of clusters of motion vectors based on one of motion vectors in each cluster and motion vectors in proximate clusters;

computer program code for allocating to each pixel in the current frame, the cluster motion vector of its corresponding cluster;

computer program code for generating an initial guess frame based on the current frame;

computer program code for blurring pixels in the guess frame as a function of their respective allocated cluster motion vector;

computer program code for comparing each blurred pixel with a respective pixel in the current frame to generate an error pixel for each respective pixel;

computer program code for blurring and weighting each error pixel; and computer program code for combining each error pixel and its respective pixel in the initial guess frame thereby to update the guess frame and compensate for blur.

The methods and systems described herein provide the benefits of increased sharpness in digital video displayed on a hold-type display, such as for example an LCD device, without suffering excessive noise amplification as is common in many known inverse filtering methods and without requiring modification of the hold-type display hardware itself. Furthermore, by grouping pixels and clustering motion vectors, prominent global and local object motion in the frame for use during pre-compensation for the perceived motion blur can be recovered quickly.

BRIEF DESCRIPTION OF THE DRAWINGS

Embodiments will now be described more fully with reference to the accompanying drawings, in which:

FIG. 7 is a flowchart showing a method of pre-compensating for perceived blur in a digital video sequence based on motion of pixels between frames;

FIG. 8 is a flowchart showing steps performed during motion vector estimation;

DETAILED DESCRIPTION OF THE EMBODIMENTS

Figure 1:
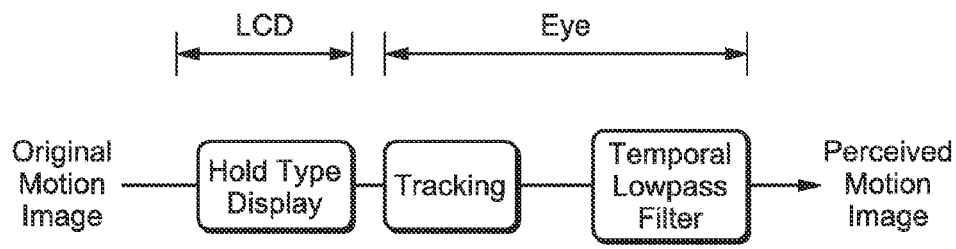
FIG. 1 is a schematic diagram showing the perceived blur in a digital video image frame resulting from a hold-type display device and the motion perception mechanism of the human visual system.

For ease of understanding, perceived blur in a digital video image caused by a hold-type display such as an LCD device that uses a sample and hold display format will firstly be discussed. Turning to FIG. 1, a schematic diagram showing perceived blur in a digital video image frame resulting from the LCD device and the motion perception mechanisms of the human visual system is shown. The following assumes that the frame rate of the LCD device is sufficiently high to permit perfect temporal integration into the human visual system within one frame interval. It has been shown by D. C. Burr, in the publication entitled "Temporal Summation of Moving Images by the Human Visual System" (Proceedings of the Royal Society of London B, 221(1184), pp. 321-339, 1981) that this condition is satisfied with frame rates of 60 Hz or higher. The following also assumes that the human eye can perfectly track region movement across the LCD device. It has been reported by S. Daly in the publication entitled "Engineering Observations From Spatiovelocity and Saptiotemporal Visual Models" (SPIE Conference on Human Vision and Electronic Imaging III, SPIE. Vol. 3299, pp. 180-191, 1998) that the human eye can reliably track targets at a speed of 80 degrees per second. This is equivalent to, for example, a motion rate of 48 pixels per frame (ppf) on a 60 Hz extended graphics array (XGA) LCD device at a viewing distance twice the width of the display.

As an input video sequence is input to a LCD device, each digital video image, or frame, from the input video sequence is displayed and sustained on the LCD device for one frame interval. While viewing a scene in motion, the human eyes actively track the scene with smooth pursuit eye movement so as to generate a stabilized image on the human retina, as described by M. J. Hawken and K. R. Gegenfurtner in the publication entitled "Pursuit Eye Movements to Second Order Motion Targets" (Journal of the Optical Society of America A, 18(9), pp 2292-2296, 2001). The human visual system then undertakes visual temporal low pass filtering in order to perceive a flicker-free image.

Figure 2A:
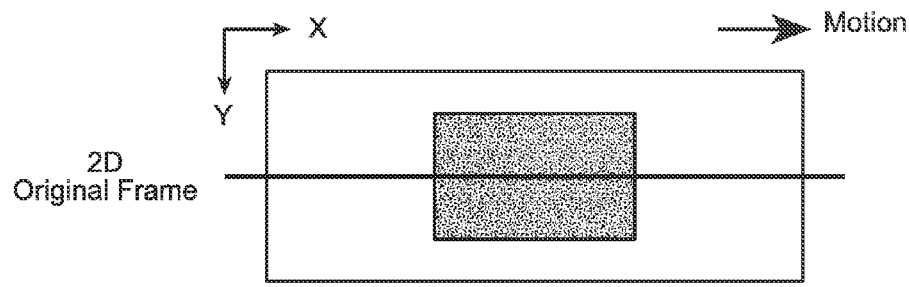
FIGS. 2a to 2d are frame and timing diagrams showing the tracking behavior of the human visual system that results in perceived blur of the frame of digital video.
Figure 2B:
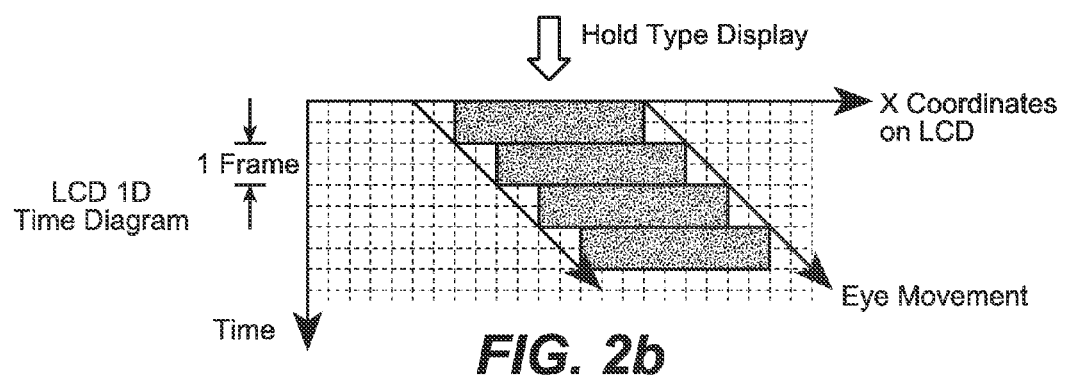
Figure 2C:
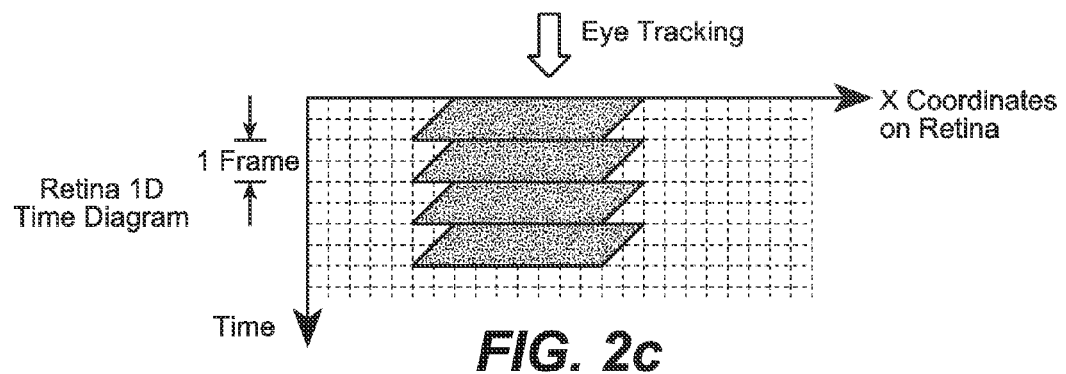
Figure 2D:
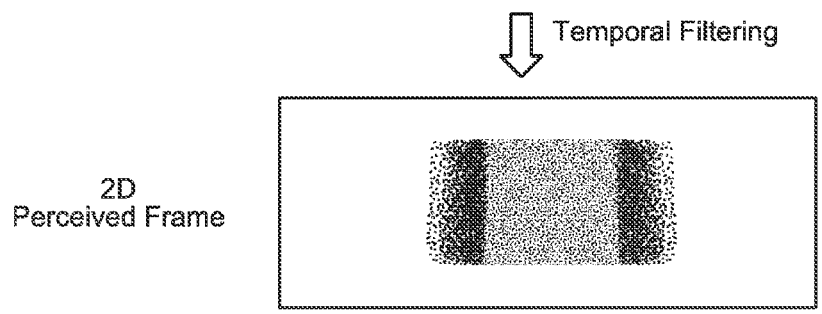

FIGS. 2a to 2d are frame and timing diagrams showing the tracking behavior of the human eye that results in perceived blur in the digital video image. FIG. 2a shows a typical frame in two dimensions. FIG. 2b shows the horizontal position of one scanline in the frame of FIG. 2a as a function of time. FIG. 2c shows the motion compensated position of the scanline after the human eye has tracked its movement. It can be seen that the same light pattern is periodically imaged on the retina resulting in somewhat steady state vision. FIG. 2d shows the frame in motion as perceived by the human visual system, as a result of integration over one frame interval. It can be seen that the frame as perceived is blurry.

Figure 3:
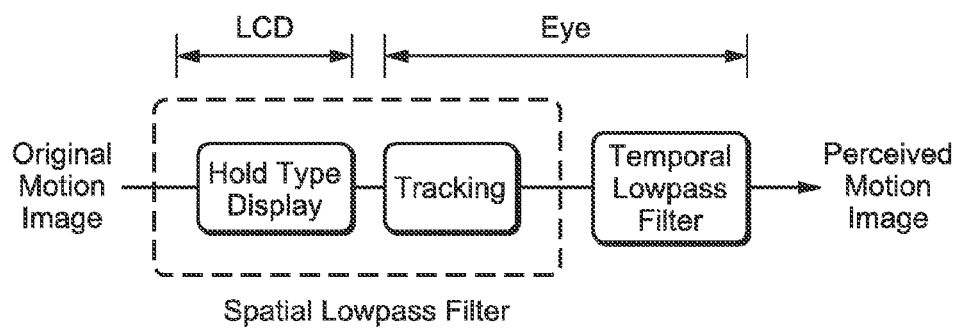
FIG. 3 is a schematic diagram illustrating a spatial low pass filtering effect resulting from the combined effects of the hold-type display device and tracking behavior of the human visual system.

It can therefore be seen that the combination of the LCD device and the tracking behavior of the human visual system results in a spatial low pass filtering effect. This effect is illustrated schematically in FIG. 3, and may be modeled mathematically as a degradation function expressed in Equations 1 and 2 below:

$$h(x) = \begin{cases} \frac{1}{vT}, & 0 \leq x \leq T \\ 0, & \text{otherwise} \end{cases} \quad (1)$$

$$H(f) = \text{sinc}(\pi f v t) \quad (2)$$

where:
  v is the frame movement in pixels per second; and
  T is the display device refresh rate in seconds.

Figure 4A:
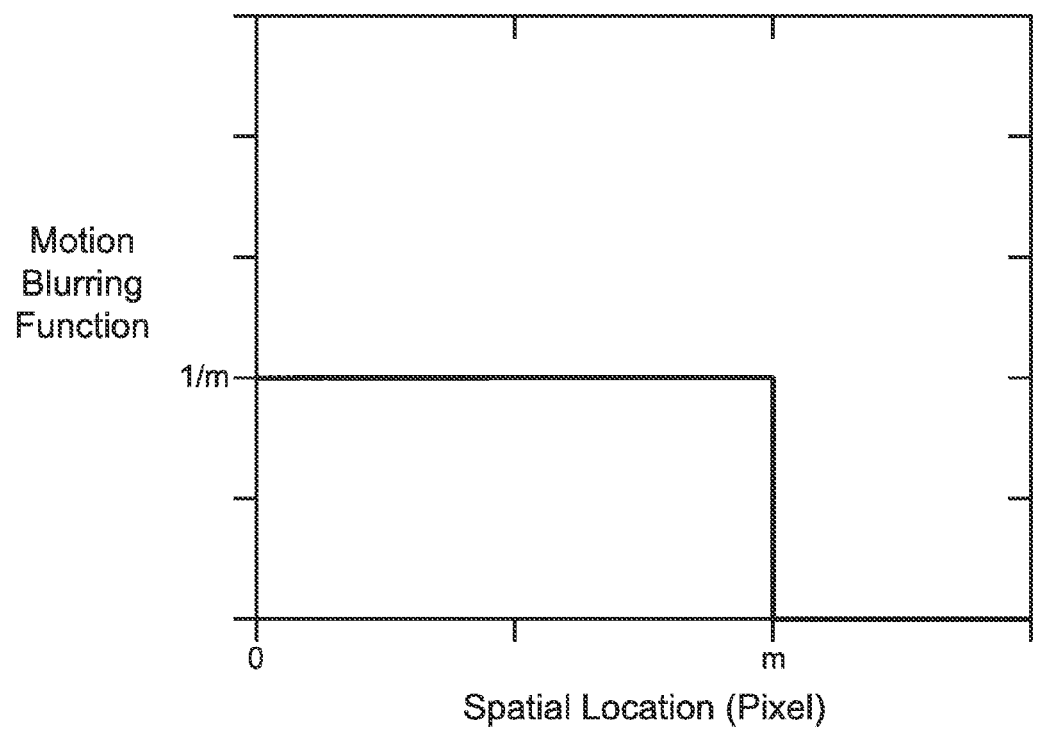
FIG. 4a is a chart of the spatial low pass filtering effect caused by the combination of the hold-type display device and the tracking behavior of the human visual system, shown in the spatial domain.
Figure 4B:
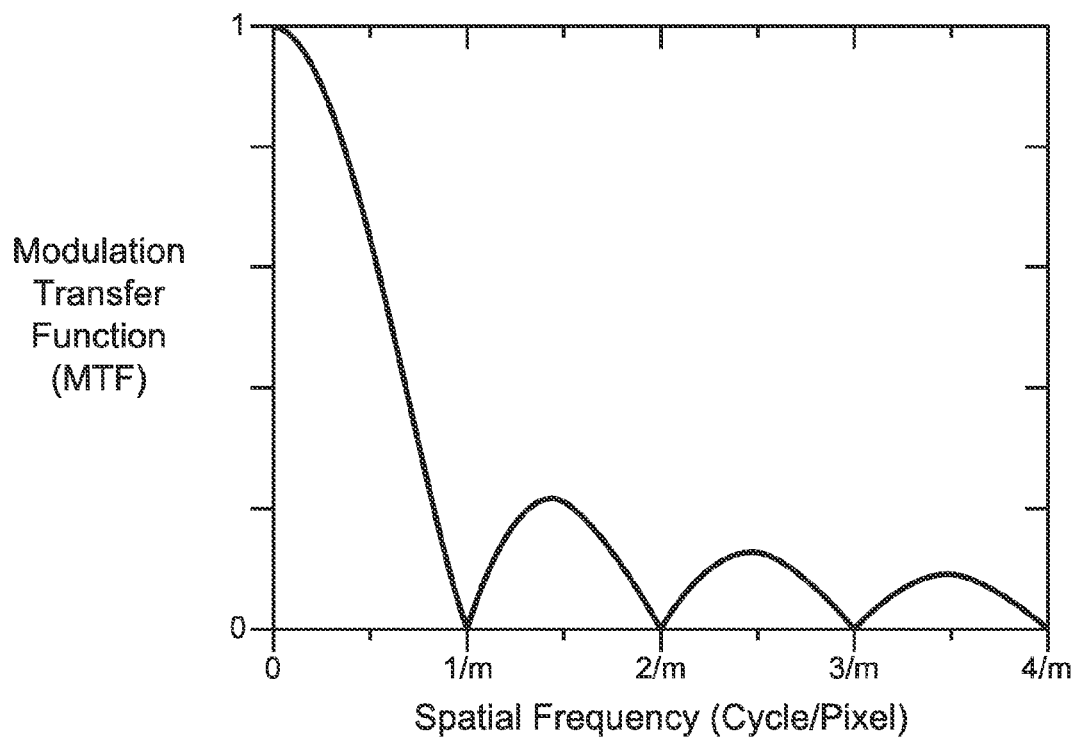
FIG. 4b is a chart of the spatial low pass filtering effect caused by the combination of the hold-type display device and the tracking behavior of the human visual system, shown in the frequency domain.

Equation (1) is a one-dimensional blurring function that is oriented in the direction of motion, and Equation (2) is the corresponding frequency domain function. Equations (1) and (2) are illustrated in the charts of FIGS. 4a and 4b, respectively.

Figure 5:
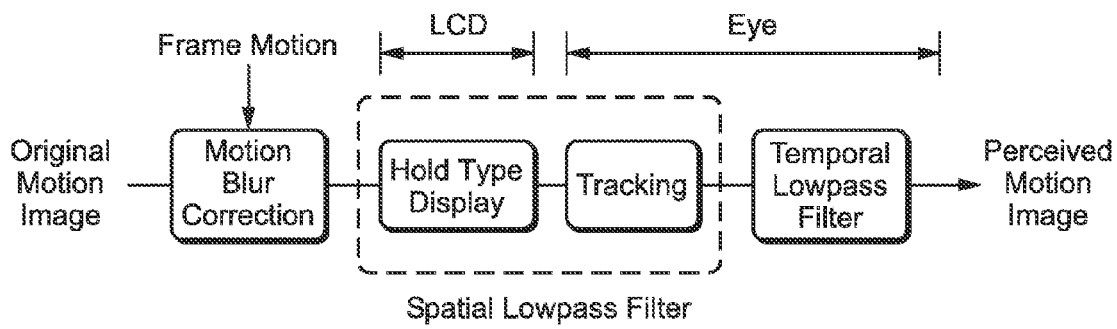
FIG. 5 is a schematic diagram showing motion blur pre-compensation for the spatial low pass filtering effect, given an estimate of motion between frames.

To deal with the perceived blur problem discussed above, a motion blur pre-compensation technique has been developed and will now be described with reference to FIGS. 5 to 13. Turning now to FIG. 5, a schematic diagram of a system showing motion blur pre-compensation for the spatial low pass filtering effect, given an estimate of motion between frames is shown. Methods have been proposed for pre-compensating for motion blur in a digital image captured with a digital camera using estimates of motion direction and motion extent of the image, as described in co-pending U.S. patent application Ser. No. 10/827,394 filed on Apr. 19, 2004 entitled "Motion Blur Correction", the content of which is incorporated herein by reference. It has been found that some of the concepts employed by methods designed to compensate for blur in still images may be effective for pre-compensating for perceived blur due to movement of pixels between frames in digital video sequences.

Figure 6:
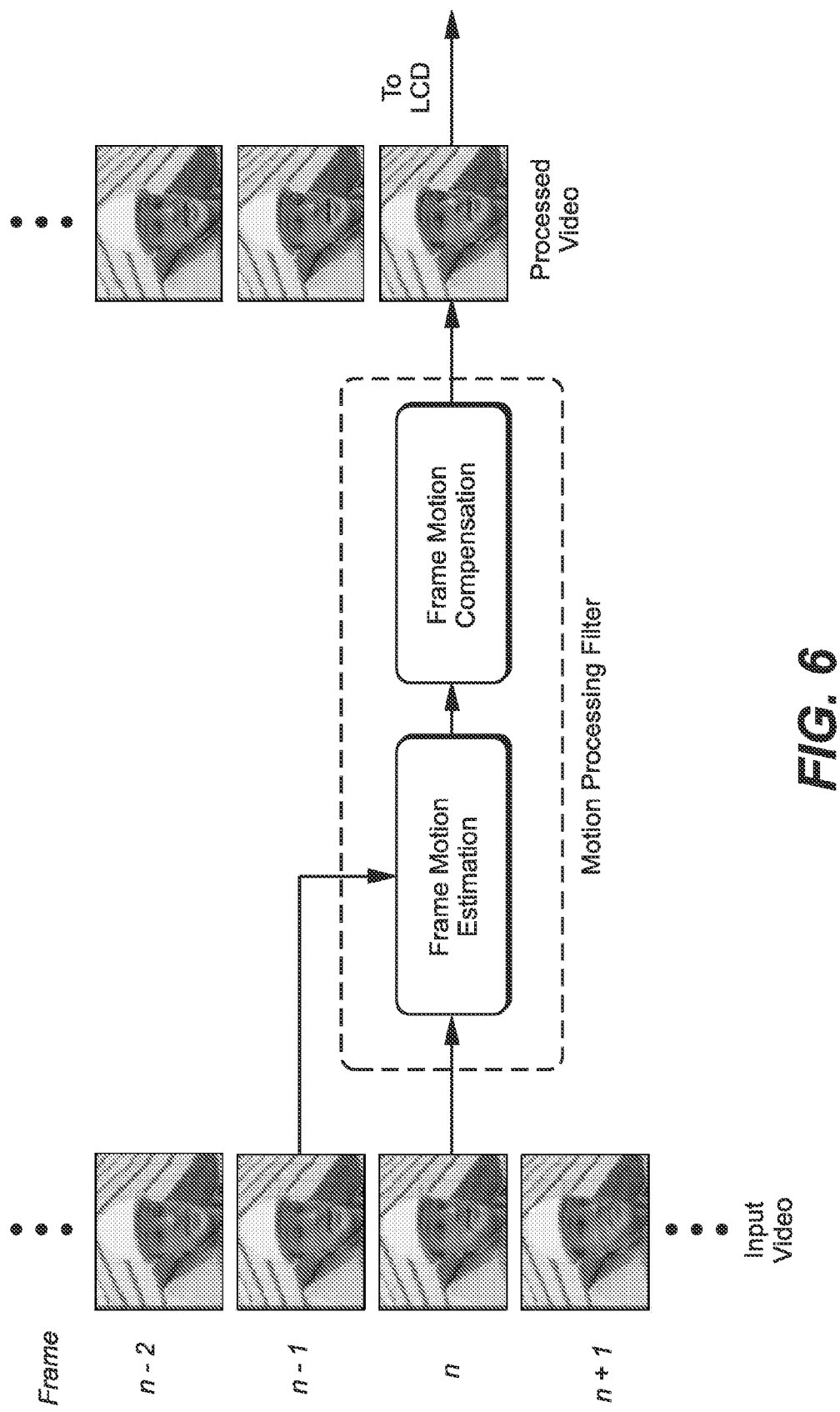
FIG. 6 is a schematic diagram showing motion blur pre-compensation for the spatial low pass filtering effect.

FIG. 6 is another schematic diagram showing motion blur pre-compensation for the spatial low pass filtering effect. In FIG. 6, each frame of a digital video sequence passes through a motion processing filter, which performs frame motion estimation and frame motion compensation. The output of the motion processing filter is provided to the LCD device. A two-frame memory buffer (not shown) is provided for enabling the digital video sequence to be processed in real-time.

FIG. 7 is a flowchart showing the steps performed in order to pre-compensate for perceived blur in a digital video sequence based on motion of pixels between frames. Upon receipt of two consecutive or successive digital video frames (a current frame $F_n$ and a previous frame $F_{n-1}$) (step 100), motion vectors between the frames are estimated for each pixel block in the current frame (step 200). Clusters of the estimated motion vectors are obtained and cluster motion vectors for the clusters are estimated and allocated to the individual pixels in the current frame (step 300). Using the allocated cluster motion vectors, the pixels of the current frame are filtered to pre-compensate for perceived blur (step 400).

The estimation of motion vectors for blocks of pixels, with subsequent clustering of the estimated motion vectors is performed in order that prominent global and local object motion in the current frame can be recovered quickly. This is in contrast to known optical flow methods, which are designed to accurately recover individual pixel motion, at the expense of performance.

FIG. 8 further illustrates the manner by which the motion vectors are estimated. First, pre-processing and feature detection (step 210) is conducted on the frames $F_n$ and $F_{n-1}$. Pre-processing begins with an extraction of the Y-channel luminance images $I_n$ and $I_{n-1}$ from each of the frames $F_n$ and $F_{n-1}$. Images $I_n$ and $I_{n-1}$ are then convolved with a 3×3 box filter for smoothing, to yield pre-processed image frames $G_n$ and $G_{n-1}$, expressed by Equations (3) and (4) below:

$$G_{n-1} = I_{n-1} \otimes H \quad (3)$$

$$G_n = I_n \otimes H \quad (4)$$

where:
  H is the filter input response.

Feature detection comprises detecting corners in the frames using a Harris corner detector, as described by C. G. Harris and M. Stephens in the publication entitled "A Combined Corner And Edge Detector" ($4^{th}$ Alvey Vision Conference, pp. 147-151, 1998). In particular, the measure $R_1$ is calculated for each of the pre-processed image frames $G_n$ and $G_{n-1}$ (individually represented as $G_l$) using Equation (5) below:

$$R_l = \frac{(D_{l,x})^2 (D_{l,y})^2 - (D_{l,x} D_{l,y})^2}{(D_{l,x})^2 + (D_{l,y})^2 + \epsilon} \quad (5)$$

where:
  x and y are the co-ordinates of pixels in image $G_l$;
  $D_{l,x}$ and $D_{l,y}$ are the horizontal and vertical directional derivatives of image $G_l$ at co-ordinate (x,y); and
  $\epsilon$ is a small number to prevent overflow.

Duplicate corners within a small neighborhood are eliminated by performing relaxation using a 7×7 maximum filter. The values of $R_1$ are then sorted in decreasing order and the first k corresponding pixels are considered to be corner pixels c(x,y), as in Equation (6) below:

$$k = \min\{\text{Total number of detected corners}, 512\} \quad (6)$$

Figures 9A, 9B, 9C, 9D:
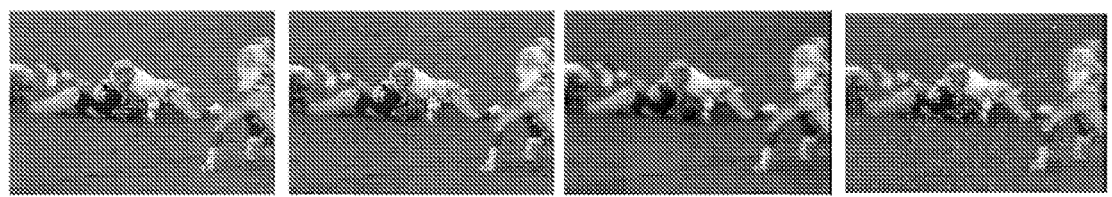
FIG. 9 is an illustrative set of two frames in a digital video sequence shown as progressively processed to detect corners.
Figures 9E, 9F, 9G, 9H:
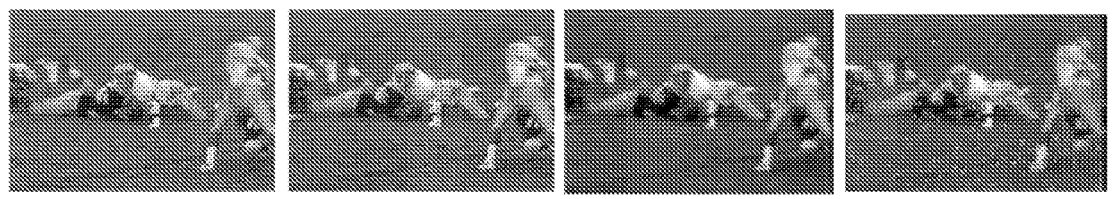

FIG. 9 is an illustrative set of two frames in a digital video sequence shown as progressively processed to detect corners. Each of the two rows shows a respective input frame (a,e), a luminance image (b,f), a box-filtered (smoothed, or blurred) luminance image (c,g) and the image with detected corners (d,h), shown as small spots.

Returning to FIG. 8, once the pre-processing and feature detection (step 210) has been performed, each of the two consecutive frames $F_n$ and $F_{n-1}$ (having height h and width w) is divided into 8×8 blocks of pixels (step 212), and an image $V_n$ of a block motion vector field is established (step 214). Image $V_n$ has a size of (h/8)×(w/8), with individual motion vector positions $V_n(i,j)$.

Each motion vector at position $V_n(i,j)$ in the block motion vector field image $V_n$ is then defined in raster scan order by selecting a motion vector from a list L of candidate motion vectors $L^{(m)}$ (step 216). In particular, the motion vector that provides the least difference between the pixel block in the current frame $F_n$ and a corresponding pixel block in the previous frame $F_{n-1}$ in the digital video sequence is selected from candidate motion vector list L, as will be further described herein. The principles of this approach, known as True-Motion Estimation are described by Ralph Braspenning and Gerard de Haan in the publication entitled "True-Motion Estimation Using Feature Correspondences" (SPIE Proceedings of Visual Communications and Image Processing, pp. 396-407, January 2004).

The list L of candidate motion vectors is established for each block, represented by position $V_n(i,j)$ in image $V_n$ according to Equation (7) below:

$$L = \begin{cases} (0,0) & \rightarrow \text{Zero vector candidate} \\ V_n(i-1,j), V_n(i,j-1) & \rightarrow \text{Spatial Candidate} \\ V_{n-1}(i+2, j+2) & \rightarrow \text{Temporal Candidate} \\ V_n(i-1,j)+\eta, V_n(i,j-1)+\eta & \rightarrow \text{Random Candidate} \\ C_n(i,j) & \rightarrow \text{Corner Candidate List} \end{cases} \quad (7)$$

where:

$V_{n-1}$ is the motion vector field from the previous two frames; and $\eta$ is a zero mean, Gaussian random variable with variance $\sigma^2$.

True-Motion Estimation is based partly on the assumption that objects moving between the consecutive frames $F_n$ and $F_{n-1}$ are larger than the pixel blocks. As such, motion vectors of neighboring blocks that have been already been estimated in the current frame $F_n$ are used as Spatial Candidates for prediction. The Spatial Candidates $V_n(i-1, j), V_n(i, j-1)$ are available on the basis that motion vectors are being chosen from candidate lists in a certain scanning order. That is, $V_n(i-1, j), V_n(i, j-1)$ must each have already been established by selection from a respective candidate list prior to selection of $V_n(i, j)$.

In a similar manner to Spatial Candidates, the Temporal Candidate $V_{n-1}(i+2, j+2)$ is provided based on a previous selection of a motion vector, in this instance for the motion vector field $V_{n-1}$ established from a previous pair of consecutive frames. For a digital video sequence, motion vectors between subsequent consecutive frames are very likely to have high correlation, so in many cases the Temporal Candidate enables fast convergence to an accurate selection for motion.

The Random Candidate $V_n(i-1, j)+\eta, V_n(i, j-1)+\eta$ is provided in order to correctly track variable object motion, based on the assumption that objects have inertia.

The Corner Candidate list $C_n(i,j)$ is obtained based upon the corners detected during the pre-processing and feature detection (step 110). For each corner c in a block of the current frame $F_n$, a correlation for all corners c' within a 25×25 window in the previous frame is made. Normalized cross correlation NCC is used for calculating a correlation score between corners c(u,v) in the current frame $F_n$ and corners c'(u',v') in the previous frame $F_{n-1}$. The normalized cross correlation NCC is expressed as:

$$NCC(c, c') = \frac{\sum_{i=-12}^{12} \sum_{j=-12}^{12} (I(u+i, v+j) - \mu_{I'})}{\left[\sum_{i=-12}^{12} \sum_{j=-12}^{12} (I(u+i, v+j) - \mu_I)^2 \\ \sum_{i=-12}^{12} \sum_{j=-12}^{12} (I'(u'+i, v'+j) - \mu_{I'})^2\right]^{1/2}} \quad (8)$$

where:

I(u,v) and I'(u',v') are the pixels in the two processed frame images.

The motion vector between corner pairs with a NCC value>0.90 is added to the Corner Candidate List $C_n(i,j)$.

The Zero Vector is provided in order to enable fast convergence and exactly a zero vector, since zero movement of pixel blocks between frames can occur frequently, depending upon the subject matter in the digital video sequence.

Each candidate motion vector $L^{(m)}$ in candidate list L is assigned a corresponding penalty $p^{(m)}$ for block difference calculations, as follows:

$$p^{(m)} = \begin{cases} \lambda^2 & \text{where } L^{(m)} \text{ is a Zero vector candidate} \\ 0 & \text{where } L^{(m)} \text{ is a Spatial Candidate} \\ 8\lambda^2 & \text{where } L^{(m)} \text{ is a Temporal Candidate} \\ 32\lambda^2 & \text{where } L^{(m)} \text{ is a Random Candidate} \\ 4\lambda^2 & \text{where } L^{(m)} \text{ is a Corner Candidate} \end{cases}$$

The penalties are assigned in order to give increased preference to the more likely True-Motion vector candidates. The penalty mechanism ensures a preference for Spatial Candidates in order to provide a smooth vector field. Random Candidates, on the other hand, are least likely to be the True-Motion vectors because they are new vectors that have not yet been found to result in a best match between pixel blocks.

The penalized sum of absolute differences (SAD) $S^{(m)}$ is then computed for each candidate vector $L^{(m)}=(u,v)$ between the motion shifted pixel block in the current image frame $G_n$ and the block in the previous image frame $G_{n-1}$, according to Equation (9):

$$S^{(m)} = \qquad (9)$$

$$p^{(m)} + \sum_{y=0}^{b-1} \sum_{x=0}^{b-1} |G_{n-1}(bi+x, bj+y) - G_n(b(i+u)+x, b(j+v)+y)|$$

where:

b is the pixel block height and width.

The candidate vector $L_{min}^{(m)}$ resulting in the lowest $S^{(m)}$ of all candidate motion vectors $L^{(m)}$ in list L is selected as the motion vector $V_n(i,j)$ for the block of pixels, and is used to update the motion vector field image $V_n$ (step 218) as expressed by Equation (10) below:

$$V_n(i,j) = L_{min}^{(m)} \qquad (10)$$

Figure 10:
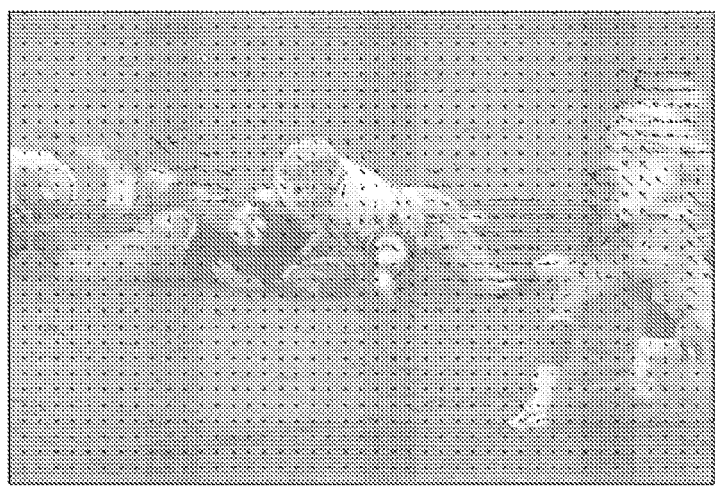
FIG. 10 is an illustrative vector field showing motion vectors of blocks of pixels between the two frames of FIG. 9.

FIG. 10 is an illustrative vector field image showing motion vectors of blocks of pixels between the two frames of FIG. 9.

Figure 11:
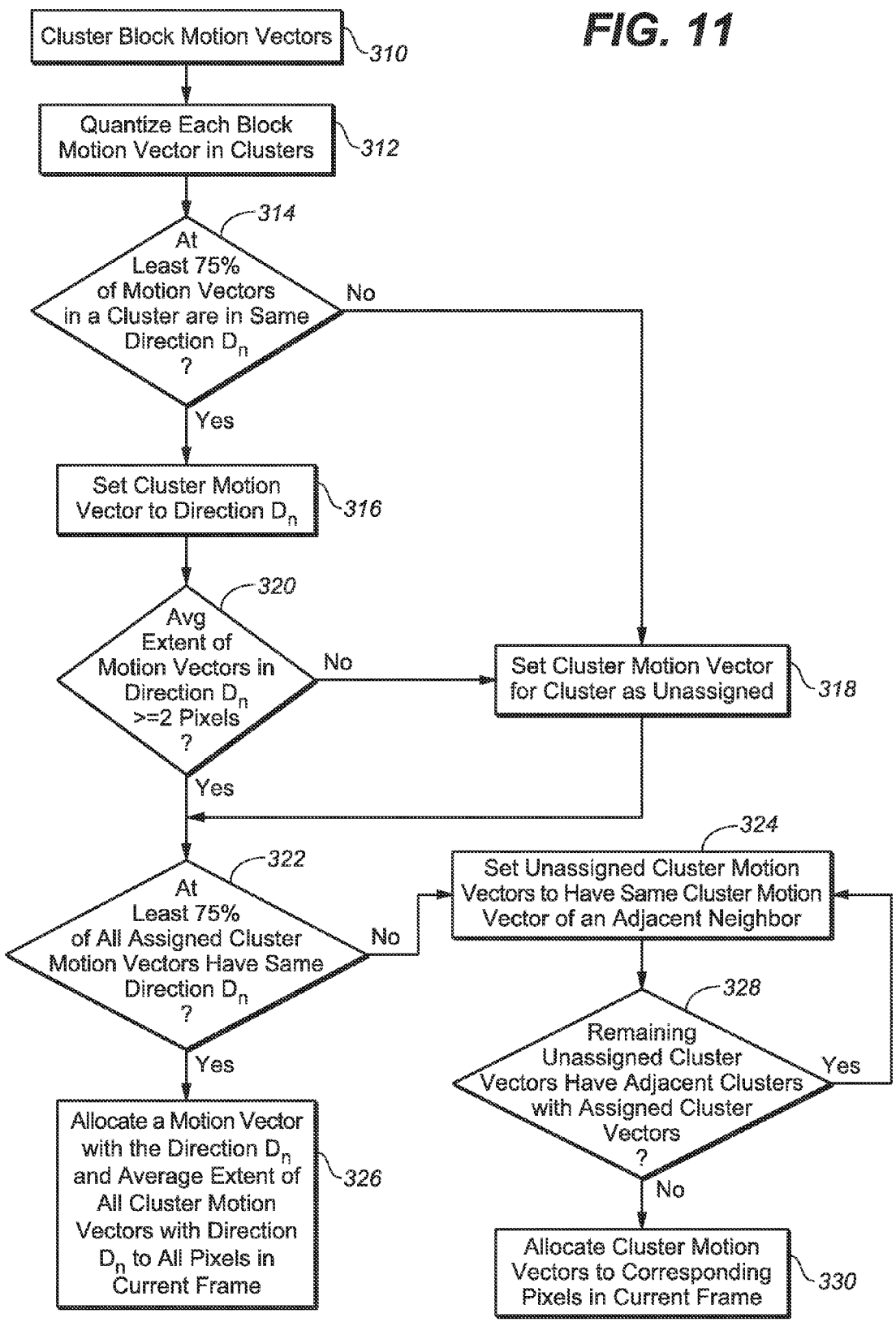
FIG. 11 is a flowchart showing steps for clustering motion vectors of blocks of pixels between the two frames to obtain motion vectors for pixels between the frames.

FIG. 11 is a flowchart further illustrating step 300 of FIG. 7 for clustering the motion vectors $V_n(i,j)$ in motion vector field image $V_n$ in order to obtain motion vectors between frames for individual pixels. Initially, motion vector field image $V_n$ is partitioned into clusters of 6×6 block motion vectors $V_n(i,j)$ (step 310) and the motion vectors $V_n(i,j)$ in the clusters are quantized to one of four (4) discrete directions (step 312). If more than 75% of the quantized direction motion vectors in a cluster have the same direction $d_n$ (step 314), then the cluster is assigned a cluster motion vector with that motion direction $d_n$ (step 316). Otherwise, the cluster is not assigned a cluster motion vector (step 318).

If the cluster is assigned a cluster motion vector with motion direction $d_n$, should the average extent of block motion vectors belonging to the cluster be less than two (2) pixels (step 320), then the assigned cluster motion vector for the cluster is cleared (step 318).

If the average extent of block motion vectors belonging to the cluster is greater than or equal to two, a check is made to determine if at least 75% of all assigned cluster motion vectors have the same direction $D_n$ (step 322). If so, all pixels in the frame are allocated a motion vector with direction $D_n$ and an extent that is the average of all assigned cluster motion vectors having direction $D_n$ (step 326). This is done by establishing a global frame motion vector that applies to all pixels in the frame.

If less than 75% of all assigned cluster motion vectors have the same direction $D_n$, then the clusters that have not been assigned a cluster motion vector are assigned a cluster motion vector that is the same as those assigned to their adjacent (proximate connecting) neighbor clusters (step 324). Neighbour clusters are those that meet the principle of 4-connectivity. This assignment of cluster motion vectors is based on the assumption that adjacent pixel blocks are likely to be part of the same object and can therefore be assumed to have the same motion between frames. This process continues iteratively until all clusters that have not been assigned a cluster motion vector and are adjacent to clusters with assigned cluster motion vector have been assigned a cluster motion vector (step 328), at which point the assigned cluster motion vectors are allocated to corresponding ones of the pixels in the current frame (step 330).

Figure 12:
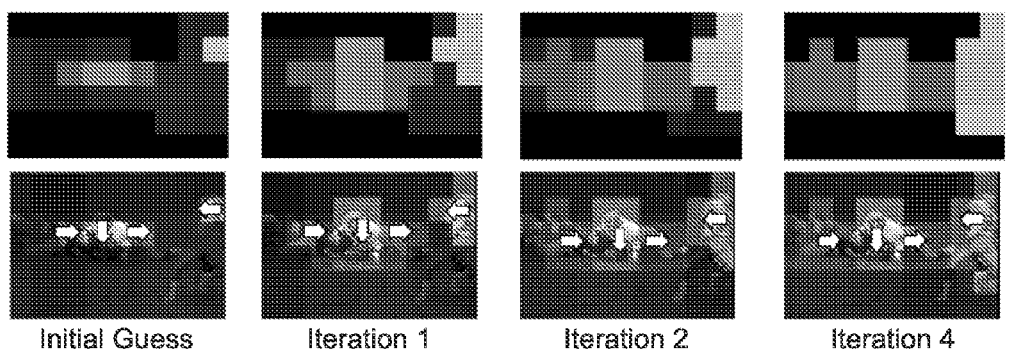
FIG. 12 shows the iterative assignment of cluster motion vectors to clusters based on the cluster motion vectors assigned to proximate neighbour clusters.

FIG. 12 shows the iterative assignment of cluster motion vectors to clusters based on the cluster motion vectors assigned to proximate neighbour clusters in order to quickly estimate prominent local object motion in the frames.

Figure 13:
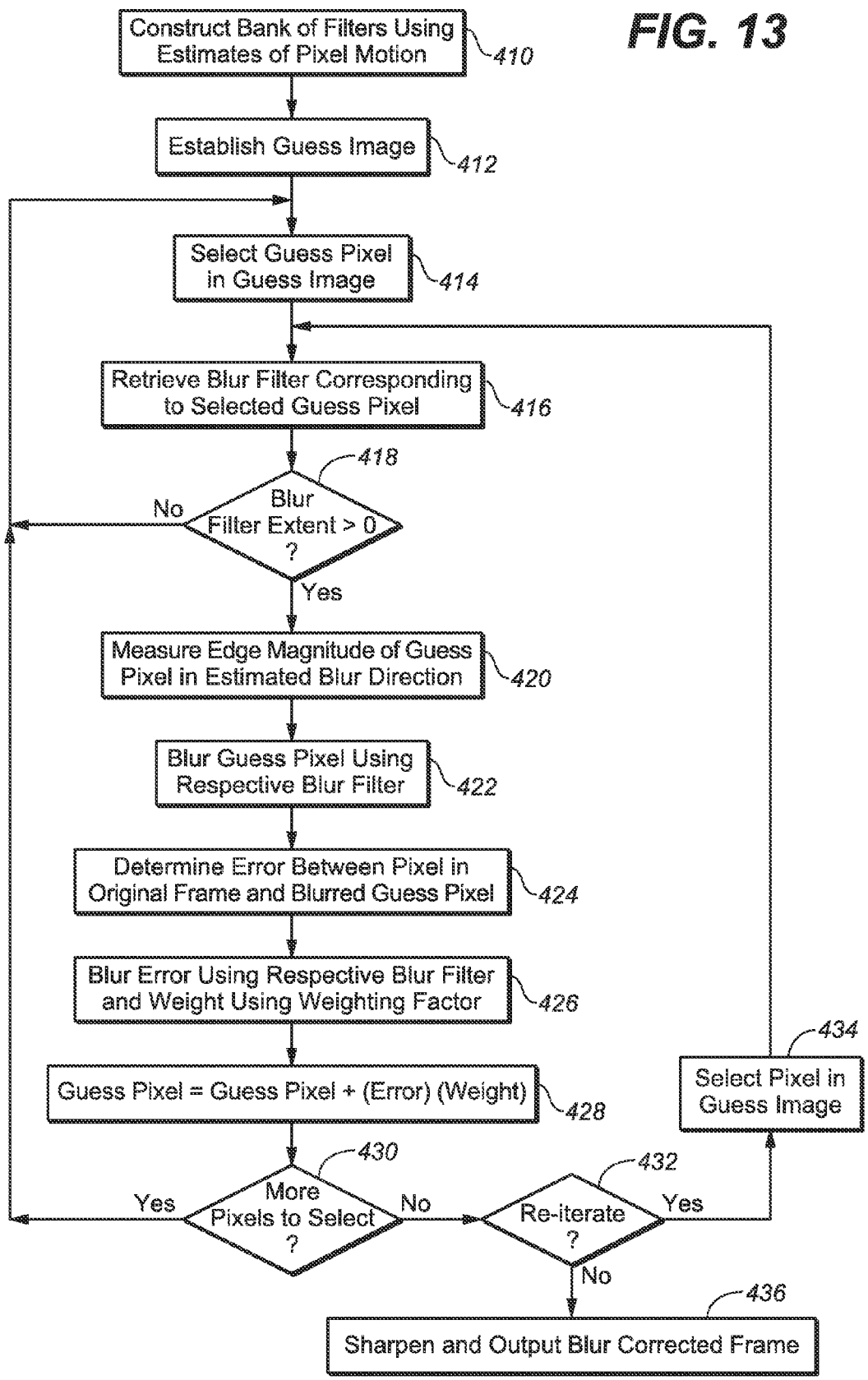
FIG. 13 is a flowchart showing steps for pre-compensating for perceived motion blur in the frame using estimated motion vectors corresponding to each pixel in the frame.

FIG. 13 is a flowchart further illustrating step 400 of FIG. 7 for pre-compensating for perceived motion blur in frame $F_n$ using the allocated motion vectors in order to produce an output frame $O_n$ for display by the LCD device. The pre-compensating that will be described below is a modification of the technique disclosed in the above-mentioned co-pending U.S. patent application Ser. No. 10/827,394, entitled "Motion Blur Correction".

From the cluster motion vectors that are allocated to respective pixels in the current frame $F_n$ during step 300, an array of K motion vectors are obtained. In the event that there are no motion vectors, then no pre-compensation is required and output frame $O_n$ is equal to the frame $F_n$.

Where there has been motion between frames, however, a filter bank is constructed (step 410) and, for each motion vector in the array, a linear blurring filter $f_k$ is created with size $s_k$ and direction $\theta_k$ corresponding to the respective motion vector, and added to the filter bank. For example, where K=2, a first of the two (2) blurring filters $f_1$ based on a motion vector with direction $\theta_1=0°$ and extent $s_1=5$ pixels would be as follows:

$$f_1 = \boxed{0.2 \mid 0.2 \mid 0.2 \mid 0.2 \mid 0.2}$$

The second of the two (2) blurring filters $f_2$ based on a motion vector with direction $\theta_2=90°$ and extent $s_2=3$ pixels would be as follows:

$$f_2 = \begin{array}{|c|} \hline 0.33 \\ \hline 0.33 \\ \hline 0.33 \\ \hline \end{array}$$

An initial guess frame is established by setting the frame $F_n$ as the initial guess image for output frame $O_n$ (step 412). A guess pixel is selected from the guess image (step 414) and a blur filter corresponding to the guess pixel is retrieved from the filter bank (step 416). If the blur filter does not have an extent that is at least one (1) pixel (step 418), then the method proceeds back to step 414 to select the next pixel. Otherwise, the edge magnitude of the guess pixel is estimated in the motion direction of the blur filter (step 420) using a Sobel edge filter and stored as a weighting factor in $W_n(x,y)$. The Sobel edge filter operation and weighting is conducted according as shown in Equations (11), (12) and (13) below:

$$dx = O_n(x, y) \otimes \begin{array}{|c|c|c|} \hline -1 & 0 & 1 \\ \hline -2 & 0 & 2 \\ \hline -1 & 0 & 1 \\ \hline \end{array} \qquad (11)$$

$$dy = O_n(x, y) \otimes \begin{array}{|c|c|c|} \hline -1 & -2 & -1 \\ \hline 0 & 0 & 0 \\ \hline 1 & 2 & 1 \\ \hline \end{array} \qquad (12)$$

$$W_n(x, y) = \cos \cdot dx(x, y) + \sin \cdot dy(x, y) \qquad (13)$$

The guess pixel is then blurred using the blur filter (step 422) by convolving $O_n(x,y)$ with the filter $f_k$ to obtain blurred pixel $B_n(x,y)$. An error between the pixel in the frame $F_n$ and the blurred guess pixel is determined (step 424) by subtracting $B_n(x,y)$ from $F_n(x,y)$ to obtain error $E_n(x,y)$. Error $E_n(x,y)$ is then blurred using the blur filter $f_k$, and weighted using the edge magnitude obtained at step 420 as a weighting factor (step 426). The guess pixel is then updated with the weighted and blurred error (step 428) according to Equation (14) below:

$$O_n(x,y)=O_n(x,y)+\beta \times E_n(x,y) \times W_n(x,y) \quad (14)$$

where:

β is a constant step size.

If there are more pixels to select in the guess image (step 430), then the method returns to step 414 to select the next pixel for pre-processing. Otherwise, the total adjustment of output frame $O_n$ is calculated to determine the overall difference ΔE between the guess image and the guess image as calculated across all pixels according to Equation (15) below:

$$\Delta E = \sum_y \sum_x [\beta \times E_n(x,y) \times W_n(x,y)] \quad (15)$$

If ΔE is below a pre-defined error threshold, then pre-compensation is complete for the frame $F_n$ and the output frame $O_n$ is sharpened using a directional sharpening filter tuned to the motion direction at each pixel location and provided as to the LCD device for display (step 436). Otherwise, a re-iteration is conducted (step 432) by selecting a pixel in the updated guess image (step 434) and reverting to step 416.

FIGS. 14a to 14d are experimental digital video sequences each having unique motion characteristics. Tests were performed on the experimental sequences with software implementing the above-described method, constructed and compiled using Microsoft™ Visual Studio™ C++6.0 on an Intel™ Pentium™ 4 with 2.26 Ghz processor speed, 256 Mb of RAM, a memory bus speed of 266 Mhz, and the Microsoft™ Windows 2000 Professional™ operating system.

Figure 14A:
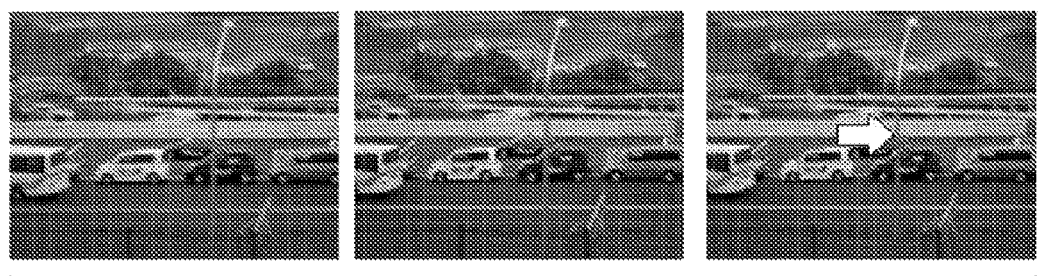
FIGS. 14a to 14d are experimental digital video sequences each having unique motion characteristics.

For the sequence in FIG. 14a, a camera with 320×240 pixel resolution panning from left to right was used to capture the two image frames forming the sequence. A comparison of the two frames resulted in a global frame motion estimation with direction θ=0° and extent of 13 pixels, as shown by the arrow overlaying the third image frame.

Figure 14B:
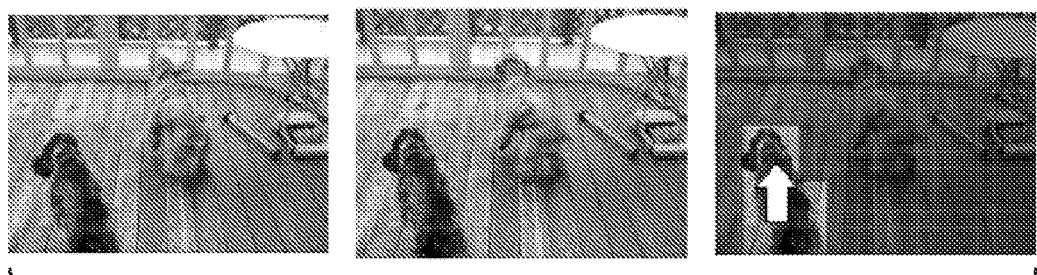

For the sequence in FIG. 14b, in which a camera with 640×480 pixel resolution was to capture the two image frames forming the sequence. In this example, the image sequence shows two dogs moving in different directions. A comparison of two frames resulted in an object motion estimation with direction θ=90° and extent of 10 pixels for one of the dogs, as shown by the arrow overlaying the one dog identified as a single moving object delineated by multiple unified clusters in the third image frame. The motion of the second dog was disregarded due to the extent of motion being lower than the extent threshold.

Figure 14C:

For the sequence in FIG. 14c, a camera with 176×144 pixel resolution was used to capture the two image frames forming the sequence. In this example, the image sequence shows a static background and a moving person. A comparison of two frames resulted in an object motion estimation with direction θ=0° and extent of 3 pixels, as shown by the arrow overlaying the moving object delineated by multiple clusters in the third image frame.

Figure 14D:

For the sequence in FIG. 14d, a camera with 320×240 pixel resolution was used to capture the two image frames forming the sequence. In this example, the image sequence shows multiple football players moving in the foreground. A comparison of two frames resulted in multiple object motion estimations. Two objects were estimated with direction θ=0° and extent 7 pixels, one object was estimated with direction θ=180° and extent 4 pixels, and one object was estimated with direction θ=270° and extent 11 pixels. These objects are shown by the arrows overlaying the objects, each object being delineated multiple clusters in the third image frame.

Figure 15A:
FIG. 15a shows simulated perceived motion blurred and motion pre-compensated frames based on the test sequence of FIG. 14c.

FIG. 15a shows simulated perceived motion blurred and motion pre-compensated frames based on the test sequence of FIG. 14c. The simulated perceived motion blurred frames were produced by integrating in the estimated motion directions according to the frame and timing diagrams of FIGS. 2a to 2d. The top left image is the original frame, the top right image is the pre-processed image, the bottom left image is the simulated perceived motion blurred image and the bottom right image is the perceived motion pre-compensated image. It can be seen that the bottom right image is sharper than the bottom left image.

Figure 15B:
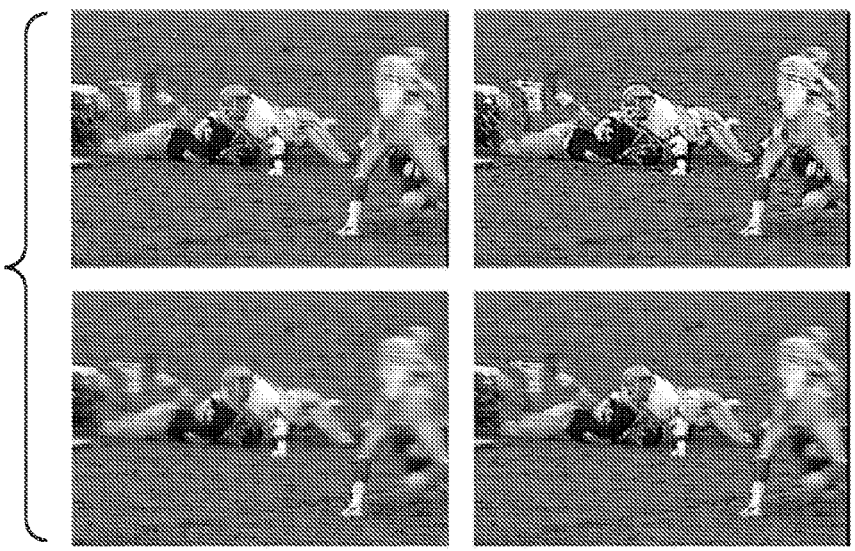
FIG. 15b shows simulated perceived motion blurred and motion pre-compensated frames based on the test sequence of FIG. 14d.

FIG. 15b shows simulated perceived motion blurred and motion pre-compensated frames based on the test sequence of FIG. 14d. The simulated perceived motion blurred frames were similarly produced by integrating in the estimated motion directions according to the frame and timing diagrams of FIGS. 2a to 2d. The top left image is the original frame, the top right image is the pre-processed image, the bottom left image is the simulated perceived motion blurred image and the bottom right image is the perceived motion pre-compensated image. It can be seen that the bottom right image is sharper image than the bottom left image.

It was found that the performance of the motion pre-compensation method described above depends partly on the complexity of motion in the original frame. It was also found that corner detection is the most computationally expensive operation in the motion pre-compensation method. Table 1 below summarizes the average frame processing time during perceived motion blur pre-compensation. Times were obtained using the built-in timer function provided by the Standard C library.

TABLE 1

| Frame Size | Standard Processing Time (ms) | Optimized Processing Time (ms) |
|---|---|---|
| 640 × 480 | 438 | 219 |
| 240 × 352 | 109 | 47 |
| 176 × 144 | 31 | 15 |

The standard processing times in Table 1 were collected during performance of the method as described above, and the optimized processing times were collected during performance of a modified method in which the corner detection was applied to a sub-sampled version of the frame.

Figure 16A:
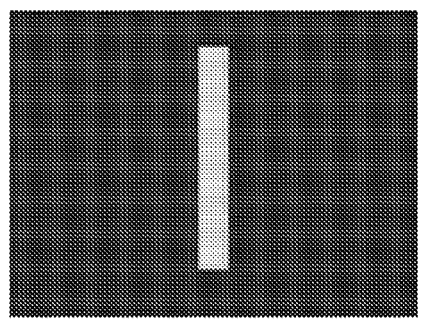
FIG. 16 shows three test images captured by a still camera and displayed without motion on an LCD device.
Figure 16B:
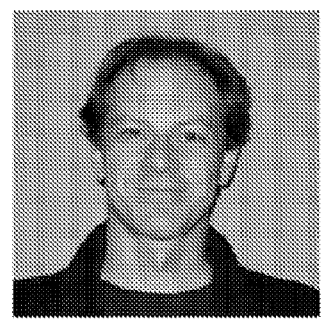
Figure 16C:

FIG. 16 shows three test images captured during an experiment by a still camera and displayed without motion on an LCD device. The camera was a Canon EOS20D, with ISO 800, aperture of F1.4-F1.6. An exposure time of 2 ms was used, and the camera resolution was 2336×3504. The LCD device was a Dell E193FP monitor with brightness level 100% and contrast level of 75%. In order to provide visualization of the perceived output, a time averaging of the images was captured on the camera at a high frame rate over the retina's normal integration time. Frame alignment was performed using the camera's shutter time stamp in each image.

Figure 17:
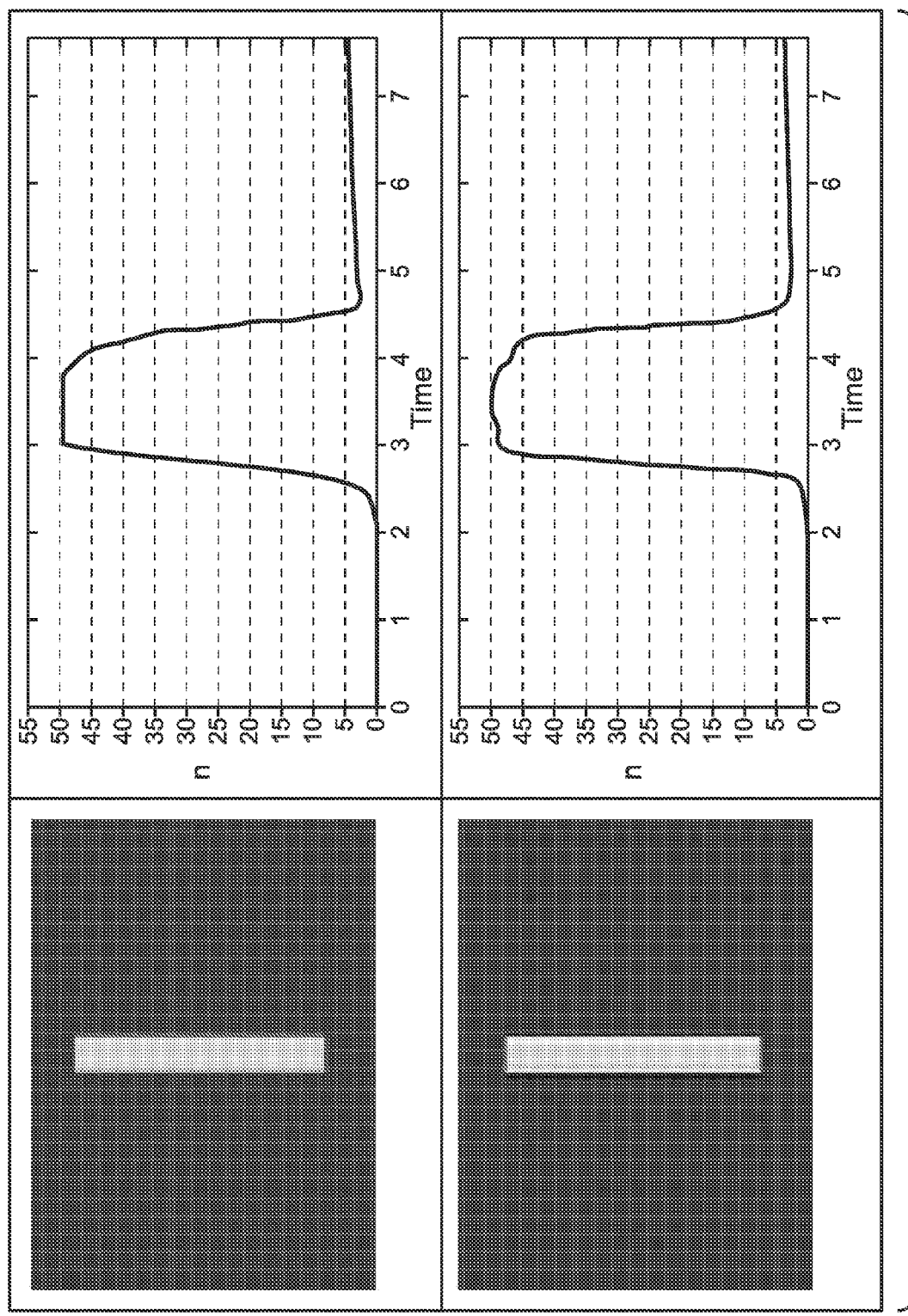
FIG. 17 shows the first of the three test images of FIG. 16 captured by a still camera and displayed with motion on an LCD device both without and with motion pre-compensation.

FIG. 17 shows the first of the three test images ("gray bar") of FIG. 16 captured by the camera and displayed with motion on an LCD device both without and with motion pre-compensation as described. The blurred edge width (BEW) of the gray bar was evaluated for a frame motion of 8 pixels per frame (ppf) for the top, unpre-processed image in FIG. 17, and was found to be 11.93 pixels on rising and 13.69 pixels on falling. The bottom, pre-processed image in FIG. 17 was measured to have a rising BEW of 7.03 pixels, and a falling BEW of 10.06 pixels, indicating that the pre-processed image was perceived by the camera as sharper.

Figure 18:
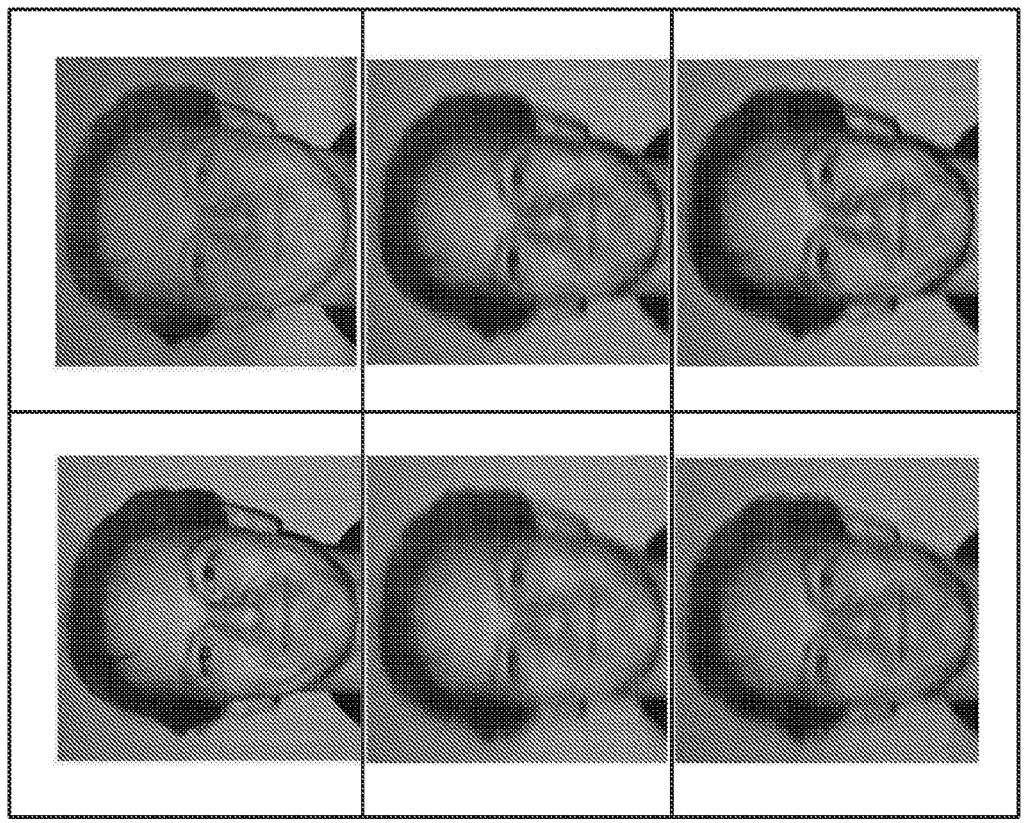
FIG. 18 shows the second of the three test images of FIG. 16 captured by a still camera as displayed without motion on an LCD device and a CRT device, and also as captured in motion both with and without motion pre-compensation.

FIG. 18 shows the second of the three test images ("face") of FIG. 16 captured by the camera and displayed without motion on both an LCD device (top left) and a CRT device (top right). Also shown is the "face" test image captured from the LCD with the camera in motion both without motion pre-compensation (middle left), and with overdrive motion pre-compensation (middle right). On the bottom row is shown the "face" test image captured from the LCD with the camera in motion after motion pre-compensation (bottom left), and as an edge motion image (bottom right). The motion rate was 8 ppf. It can be seen that the sharpened and edge motion pre-processed images result in the appearance of sharper features such as the eyes and lips areas on the face.

Figure 19:
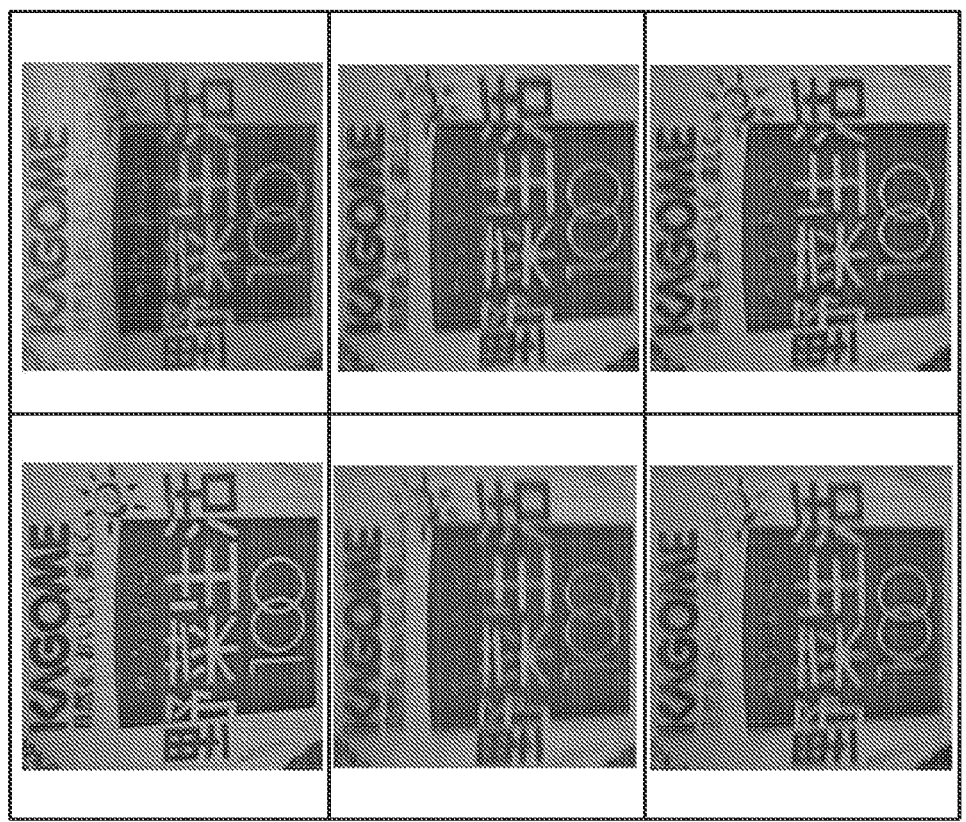
FIG. 19 shows the third of the three test images of FIG. 16 captured by a still camera as displayed without motion on an LCD device and a CRT device, and also as captured in motion both with and without motion pre-compensation.

FIG. 19 shows the third of the three test images ("drink box") of FIG. 16 captured by the camera and displayed without motion on both an LCD device (top left) and a CRT device (top right). Also shown is the "drink box" test image captured from the LCD with the camera in motion both without motion pre-compensation (middle left), and with overdrive motion pre-compensation (middle right). On the bottom row is shown the "drink box" test image captured from the LCD with the camera in motion after motion pre-compensation (bottom left), and as an edge motion image (bottom right). The motion rate was 8 ppf. It can be seen that the sharpened and edge motion pre-processed images result in sharper text characters.

Although a specific embodiment has been described above with reference to the Figures, it will be appreciated that alternatives are possible. For example, while a filter size of 3 was used during the pre-processing and feature detection at step 210, other filter sizes may be used as desired in order to achieve effects suited to a particular implementation. Furthermore, while a Harris corner detector was described for use in determining the corners for feature matching, other corner detection algorithms may be employed, such as the SUSAN algorithm described by S. Smith and J. Brady in the publication entitled "Susan—a new approach to low level image processing" (International Journal of Computer Vision 23, pp. 45-78, May 1997).

While pixel block sizes of 8×8 for use during step 212 were described, it will be understood that larger or smaller block sizes may be selected, having an according effect on the processing time vs. performance trade-off.

While a 25×25 pixel neighborhood was used for calculating the normalized cross-correlation during feature matching at step 216, it will be understood that other neighborhood sizes may be selected. Furthermore, while all normalized cross correlation calculations above 0.90 were chosen as candidates for the candidate motion vector list, this threshold may be increased or decreased as desired to suit the particular implementation.

While clusters of 6×6 block motion vectors were used to provide data for a cluster motion vector, it will be understood that clusters of greater or fewer block motion vectors may be used, depending on the needs of the particular implementation. Furthermore, while the percentage threshold is of motion vectors with the same direction $d_n$ or cluster motion vectors with the same direction $D_n$ were chosen to be at least 75%, it will be understood that these thresholds may be greater or smaller as required to suit the particular implementation.

While the sum of error failing to change more than a threshold amount has been described as the criterion employed for determining that the iterative pre-compensation is complete, it will be understood that the pixel blurring, comparing, error pixel blurring and weighting, and combining may be performed iteratively a predetermined number of times, as required to suit the particular implementation.

The method and system may be embodied in a software application including computer executable instructions executed by a processing unit such as a personal computer or other computing system environment. The software application may run as a stand-alone digital image/video editing tool or may be incorporated into other available digital image/video editing applications to provide enhanced functionality to those digital image video editing applications. The software application may comprise program modules including routines, programs, object components, data structures etc. and be embodied as computer readable program code stored on a computer readable medium. The computer readable medium is any data storage device that can store data, which can thereafter be read by a computer system. Examples of computer readable medium include for example read-only memory, random-access memory, CD-ROMs, magnetic tape and optical data storage devices. The computer readable program code can also be distributed over a network including coupled computer systems so that the computer readable program code is stored and executed in a distributed fashion.

Although embodiments have been described, those of skill in the art will appreciate that variations and modifications may be made without departing from the spirit and scope of the invention defined by the appended claims.

What is claimed is:

1. A method of compensating for perceived blur due to motion between a current frame and a previous frame of a digital video sequence using estimates of motion direction and motion extent of pixels between the frames, the method comprising:
   generating an initial guess frame based on the current frame;
   blurring pixels in the guess frame as a function of their respective estimated blur directions and blur extents;
   comparing each blurred pixel with a respective pixel in the current frame to generate an error pixel for each respective pixel;
   blurring and weighting each error pixel; and
   combining each error pixel and its respective pixel in the initial guess frame thereby to update the guess frame and compensate for blur.

2. The method of claim 1, wherein the weighting is a function of the respective pixel motion.

3. The method of claim 2, wherein the weighting is an estimate of the edge magnitude of the respective pixel in the guess image in the direction of pixel motion.

4. The method of claim 2 wherein the pixel blurring, comparing, error pixel blurring and weighting, and combining are performed iteratively.

5. The method of claim 4 wherein the pixel blurring, comparing, error pixel blurring and weighting, and combining are performed iteratively until a sum of error falls below a threshold level.

6. The method of claim 4 wherein the pixel blurring, comparing, error pixel blurring and weighting, and combining are performed iteratively a predetermined number of times.

7. The method of claim 4 wherein the pixel blurring, comparing, error pixel blurring and weighting, and combining are performed iteratively until a sum of error fails to change by more than a threshold amount between successive iterations.

8. A computer readable medium embodying a program of instructions executable by the computer to perform the method of claim 1.

9. A method of compensating for perceived blur due to motion between a current frame and a previous frame of a digital video sequence comprising:
- estimating a motion vector between the frames for each of a plurality of pixel blocks in the frames;
- estimating a cluster motion vector for each of a plurality of clusters of motion vectors based on one of motion vectors in each cluster and motion vectors in proximate clusters;
- allocating to each pixel in the current frame, the cluster motion vector of its corresponding cluster;
- generating an initial guess frame based on the current frame;
- blurring pixels in the guess frame as a function of their respective allocated cluster motion vector;
- comparing each blurred pixel with a respective pixel in the current frame to generate an error pixel for each respective pixel;
- blurring and weighting each error pixel; and
- combining each error pixel and its respective pixel in the initial guess frame thereby to update the guess frame and compensate for blur.

10. A system for compensating for perceived blur due to motion between a current frame and a previous frame of a digital video sequence using estimates of motion direction and motion extent of pixels between the frames, the system comprising:
- a motion processing filter that:
- blurs pixels in an initial guess image, that is based on the current frame, as a function of their respective estimated blur directions and blur extents;
- compares each blurred pixel with a respective pixel in the current frame to generate an error pixel for each respective pixel, and further blurs and weights each error pixel; and
- combines each error pixel and its respective pixel in the initial guess frame thereby to update the guess frame and compensate for blur.

11. The system of claim 10, wherein the weighting is a function of the respective pixel motion.

12. The system of claim 11, wherein the weighting is an estimate of the edge magnitude of the respective pixel in the guess image in the direction of pixel motion.

13. The system of claim 11 wherein the motion processing filter iteratively performs the blurring, comparing, blurring and weighting, and combining.

14. The system of claim 13 wherein the motion processing filter iteratively performs the blurring, comparing, blurring and weighting, and combining until the sum of error falls below a threshold level.

15. The system of claim 13 wherein the motion processing filter iteratively performs the blurring, comparing, blurring and weighting, and combining a predetermined number of times.

16. The system of claim 13 wherein motion processing filter iteratively performs the blurring, comparing, blurring and weighting, and combining until the sum of error fails to change by more than a threshold amount between successive iterations.

17. The system of claim 10 wherein the initial guess frame is the current frame.

18. The system of claim 17, wherein the motion processing filter provides weighting based on an estimate of the edge magnitude of the respective pixel in the guess frame in the direction of pixel motion.

* * * * *